United States Patent [19]

Dax

[11] 4,005,421
[45] Jan. 25, 1977

[54] MONOPULSE RADAR SYSTEM AND METHOD FOR IMPROVED LOW ELEVATION TRACKING

[75] Inventor: Peter R. Dax, Severna Park, Md.
[73] Assignee: Westinghouse Electric Corporation, Pittsburgh, Pa.
[22] Filed: May 30, 1973
[21] Appl. No.: 365,245
[52] U.S. Cl. .............................................. 343/16 M
[51] Int. Cl.² .......................................... G01S 9/22
[58] Field of Search ................. 343/16 M, 7.4, 7 A, 343/7.3

[56] References Cited

UNITED STATES PATENTS

| 3,197,776 | 7/1965 | Winn | 343/16 M |
| 3,229,283 | 1/1966 | Hefter et al. | 343/16 M UX |
| 3,757,326 | 9/1973 | White | 343/16 M X |
| 3,778,824 | 12/1973 | Roger | 343/16 M X |
| 3,778,827 | 12/1973 | Strenglein | 343/7.3 |

OTHER PUBLICATIONS

Department of the Army Technical Manual TM 9-60-92-3-1, Oct. 1956, pp. 45 & 159.

Primary Examiner—T.H. Tubbesing
Attorney, Agent, or Firm—R. M. Trepp

[57] ABSTRACT

A method and monopulse radar system for improved tracking of low elevation targets in the presence of multipath signals through the use of an off-boresight tracking technique preferably in conjunction with a novel monopulse radar antenna sum and elevation difference signal channel patterns.

12 Claims, 11 Drawing Figures

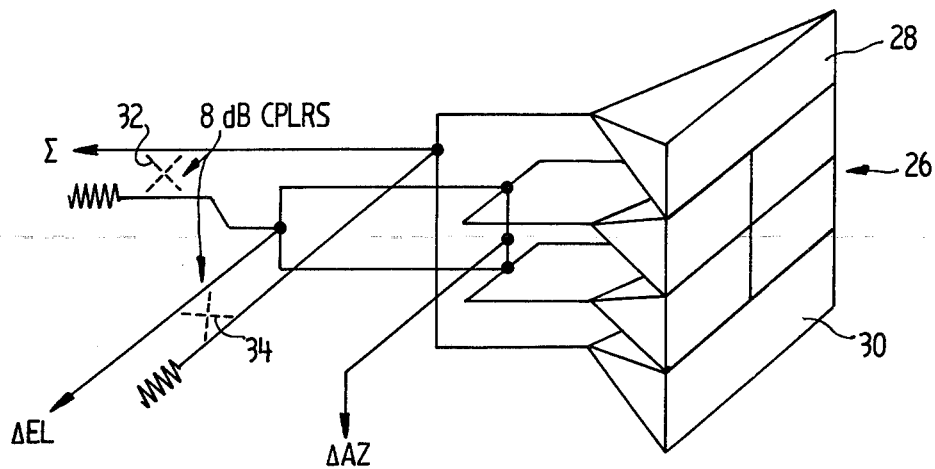
FIG.6 SCHEMATIC OF FEED
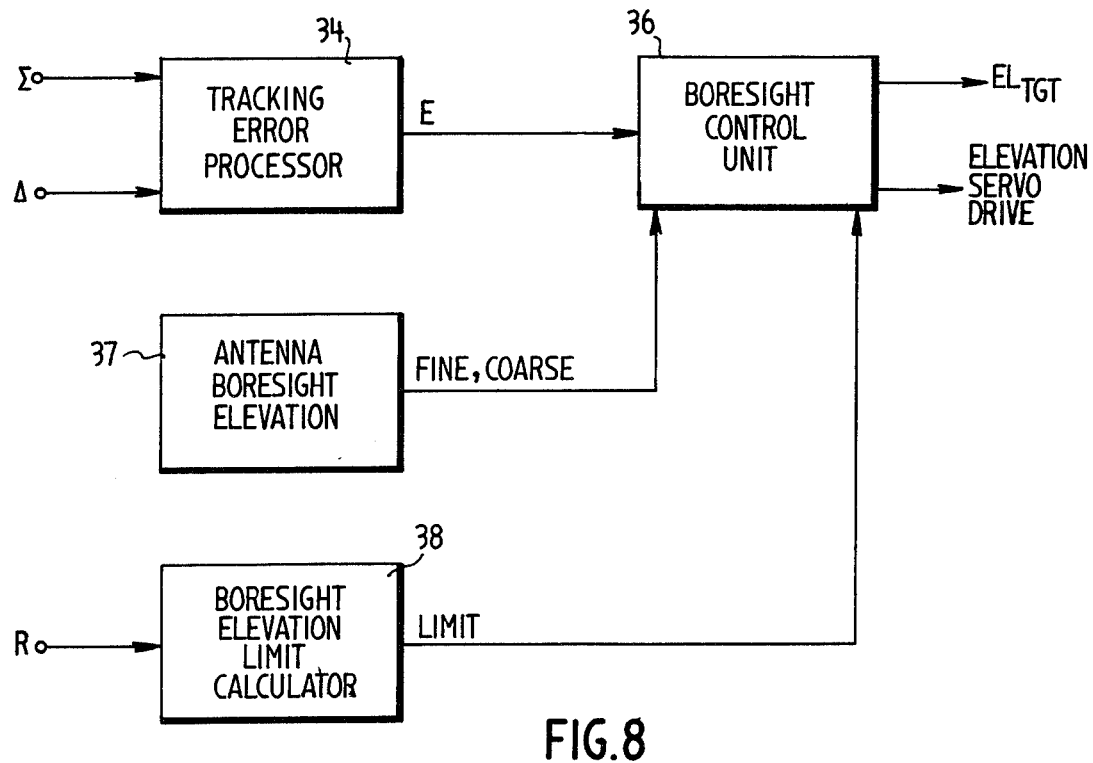
FIG.8

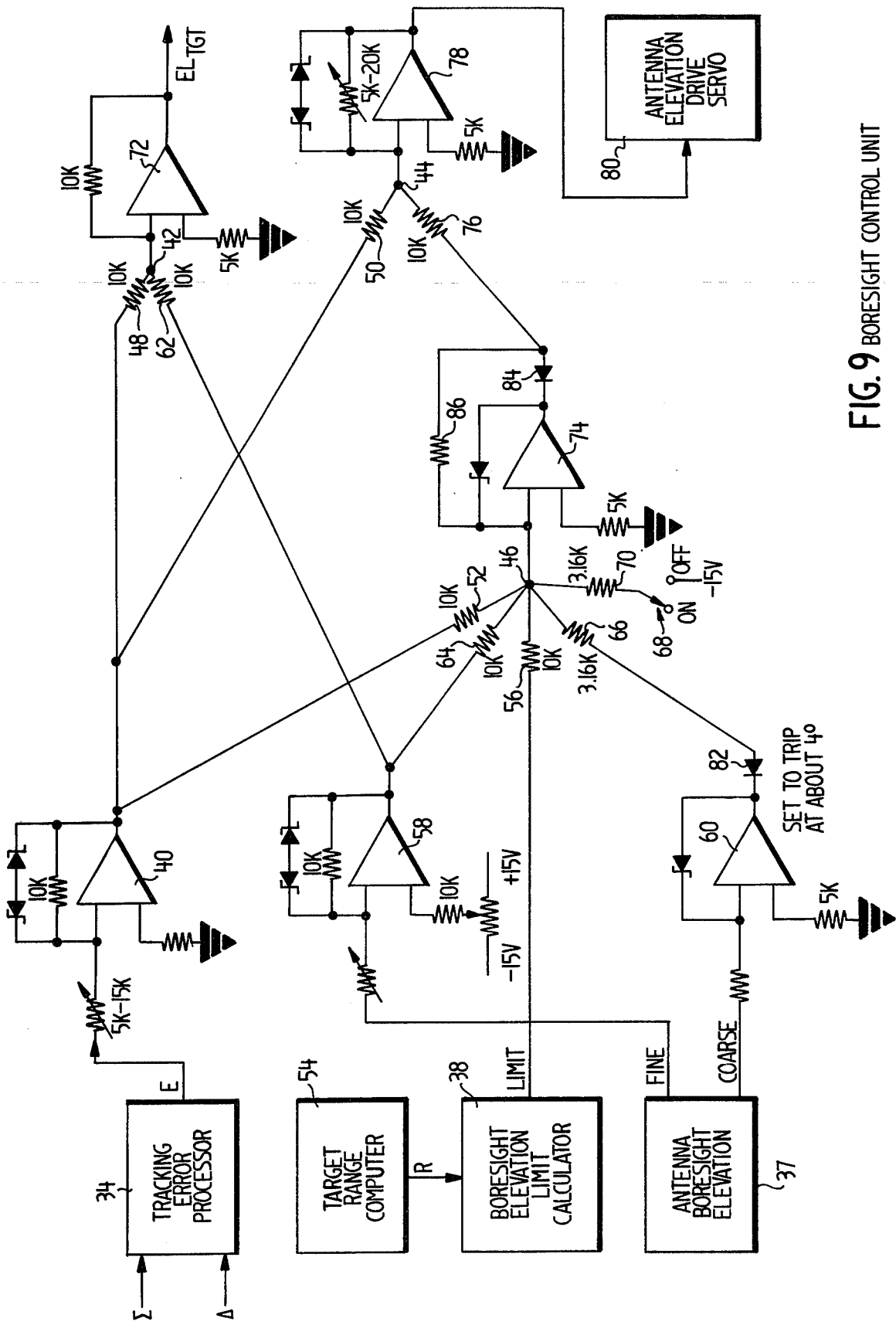
FIG. 9 BORESIGHT CONTROL UNIT

MONOPULSE RADAR SYSTEM AND METHOD FOR IMPROVED LOW ELEVATION TRACKING

BACKGROUND OF THE INVENTION

1. Field of the Invention

The present invention relates to monopulse tracking radars and more particularly to a method and system including a novel monopulse tracking radar antenna and antenna positioning system for tracking targets at low elevation angles.

2. State of the Prior Art

When the elevation angle of a target being tracked by a monopulse radar is less than approximately one beamwidth, troublesome multipath return signals or target echoes are received by the tracking radar system. The receipt of multipath signals typically occurs when the tracking radar is adjacent a reflective surface such as the sea, and energy reflected from a target is received both directly from the target and from the reflective surface. As a result of the multipath signals entering the tracking radar feedhorn by way of the direct path and the reflected path, two unresolved targets at about the same range are within the radar beam at the same time. The radar system simultaneously "sees" the actual target and an image of the actual target because of the received multipath signals.

The monopulse radar system, in the presence of multipath signals angularly separated by less than approximately one beamwidth combines the multipath signals and attempts to null on the composite signal. The radar may then either oscillate about a mean position or may oscillate in what appears to be a random fashion over an angle of about one beamwidth centered about the bisector of the angle between the target and its image. The monopulse radar will frequently lose track altogether under these circumstances.

Several possible solutions to the problem of multipath signals at low target elevation angles have been explored. For example, by increasing either the aperture or the frequency of the monopulse radar system, the resolution may be improved thus permitting lower elevation angle tracking without the above discussed problems. However, this solution merely decreases the likelihood of encountering multipath problems and is difficult to apply to the existing radars.

The use of passive screens to screen out undesired multipath signals is quite impractical at sea, and in any case replaces the multipath problem with one of diffraction over the top of the screen. Other possible solutions which appear to have merit conceptually include distinguishing between the direct and reflected signals on the basis of time of arrival, doppler difference, or polarization. Separation of multipath signals on the basis of time of arrival or doppler difference is very difficult in practice in that these differences are so small that either a very wide bandwidth or unachievable doppler resolution would be required. Similarly, the separation of multipath signals on the basis of polarization can be shown to be impractical since, at the frequencies and elevations of interest, the polarization of the return signal is not changed on reflection from the sea surface.

OBJECTS AND SUMMARY OF THE INVENTION

It is accordingly an object of the present invention to provide a novel method and monopulse radar system for accurately tracking low elevation angle targets.

It is another object of the present invention to provide a novel monopulse tracking radar antenna pattern and system employing the antenna pattern for tracking targets at low elevation angles.

It is a further object of the present invention to provide a novel method and monopulse radar tracking system employing off-boresight tracking at low target elevation angles.

It is yet another object of the present invention to provide a novel method and monopulse radar system wherein the quadrature component of tracking error is minimized at low target elevation angles through the use of a novel radar antenna pattern and by locating the boresight at an angle determined by target range.

In accordance with one embodiment of the invention, a monopulse tracking radar antenna pattern is modified so that the elevation error signal function of the radar is approximately symmetrical about a peak error signal amplitude value occurring at a predetermined off-boresight angle. A minimum or lower limit of boresight elevation angle is selected as a function of target range and, for targets below the selected minimum boresight elevation, target elevation is calculated as a function of the selected minimum boresight elevation and the off-boresight tracking error.

More specifically, the monopulse radar antenna pattern is configured to define sum and elevation difference channels which provide sum and elevation difference signals which, when processed, provide the desired elevation error signal function. The lower limit of boresight elevation angle is selected as a function of range so that at low target elevations, the bisector of the angle between the actual target and the image of the actual target, i.e., the target/image bisector, approximately coincides with the peak value of the error function. When the actual boresight elevation angle coincides with the selected boresight angle, elevation tracking is modified to an open-loop mode, but azimuth tracking is maintained in the normal closed loop mode. Actual target elevation is calculated by combining actual boresight elevation angle with the error signal representing the off-boresight elevation error of the target.

BRIEF DESCRIPTION OF THE DRAWINGS

FIG. 6 is a schematic diagram of one embodiment of a monopulse radar feedhorn for providing sum, difference and error functions of the type illustrated in FIG. 5;

FIG. 8 is a functional block diagram of one embodiment of an error processing system for a monopulse tracking radar system in accordance with the present invention; and, FIG. 9 is a functional block diagram of one embodiment of the boresight control unit of FIG. 8.

DETAILED DESCRIPTION

Figure 1:
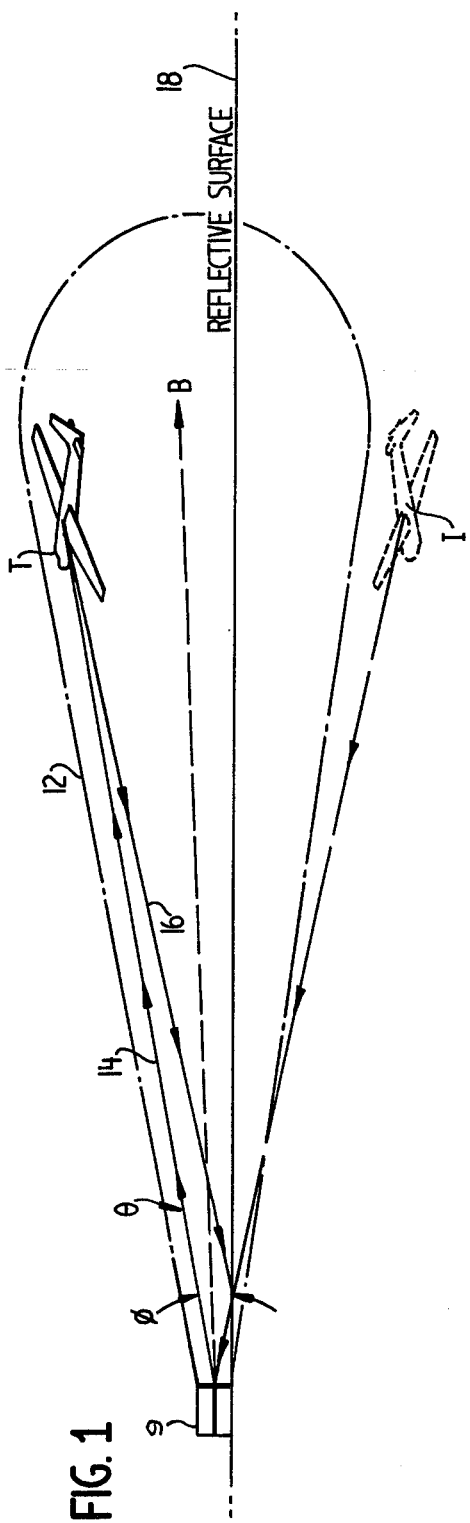
FIG. 1 is a pictorial representation of a monopulse radar system illustrating the tracking of a target at an elevation angle less than approximately one radar beamwidth.
Figure 2B:
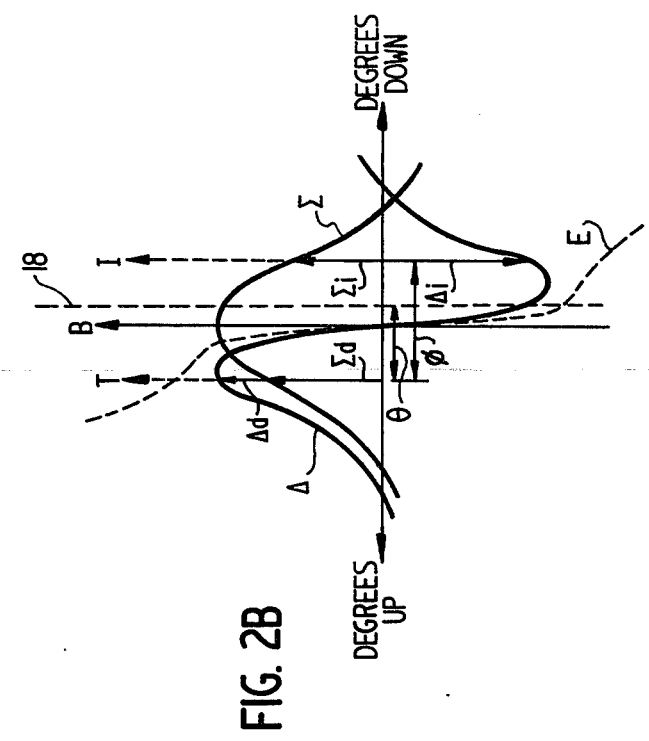
FIG. 2B is a graphical representation of typical patterns of sum, difference and error functions of a conventional four-horn monopulse radar antenna, such as that illustrated in FIG. 2A.
Figure 2A:
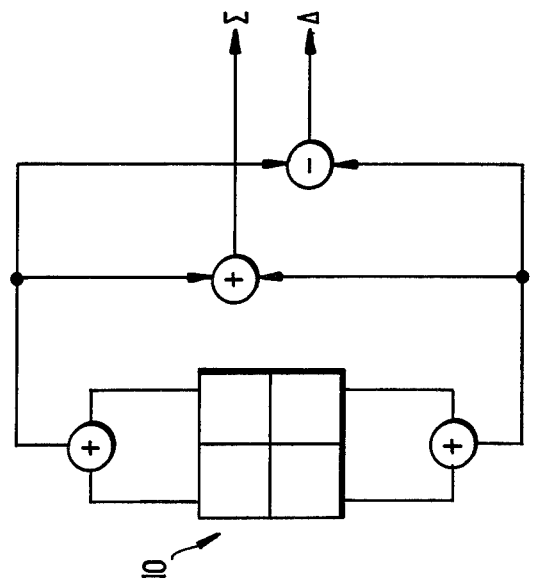
FIG. 2A is a front view of a typical cluster of four feedhorns for use on a monopulse radar antenna showing the generation of the $\Sigma$ and $\Delta$ patterns in elevation.

Referring to FIGS. 1 and 2A, a typical monopulse radar system periodically transmits pulses of wave energy through an antenna 9 including a cluster of four feedhorns generally indicated at 10 and illustrated in greater detail in FIG. 2A. Each pulse of wave energy travels outwardly from the feedhorns 10 within the confines of a "beam" 12 which has a beamwidth usually specified in terms of an angle, e.g., a 4° beamwidth. The angular beamwidth is, of course, a function of the design of the feedhorns 10 in association with the antenna reflector (not shown).

Energy striking a target T is reflected therefrom and is returned to the feedhorn 10. The return energy enters the feedhorns 10 and is combined in sum and difference signal channels as is schematically illustrated in FIG. 2A to produce a sum signal $\Sigma$ and an elevation difference signal $\Delta$. The sum and difference signals may then be processed to produce a normalized error signal E which may be represented as follows:

$$E = \Delta/\Sigma \qquad (1)$$

In tracking a target at an elevation angle above one radar beamwidth, the sum and difference signals may be processed such that the resultant error signal E provides an indication of the amount and direction of angular displacement between the radar antenna boresight and the line-of-sight to the target. Thus, with reference to FIG. 1, if the boresight B of the antenna 9 is not coincident with the direct or line-of-sight path 14 to the target T, the tracking error signal E related to the amount and direction of noncoincidence is generated. This tracking error signal is typically applied to the radar antenna drive servo system and the antenna is driven in a direction tending to null or at least minimize the error signal.

In tracking low elevation targets, the return energy takes a direct path along the line-of-sight to the target, as is generally indicated at 14 in FIG. 1, and may also return to the feedhorns 9 by way of other paths such as a reflected path generally indicated at 16. For example, energy reflected from the target T along the path 16 would not ordinarily enter the feedhorns 10. However, upon striking a reflective surface 18 (e.g., the surface of the sea) having a coefficient of reflection A the energy is reflected upwardly and enters the feedhorns 10. The radar system thus receives multipath signals i.e., at least two signals over different paths, which result in the appearance of two targets; the actual target T and the image target I.

With continued reference to FIG. 1 and with reference now to FIG. 2B in a typical monopulse radar system, antenna sum and elevation difference signal channels produce boresight referenced sum and difference signal patterns over approximately one angular beamwidth essentially as is illustrated in FIG. 2B. The error function E is produced in response to the processing of the sum and difference signals and is typically relatively linear in the general vicinity of the antenna boresight B. However, beyond the peaks of the difference pattern, the error function E has been thought to be of little interest and may vary as in FIG. 2B.

Figure 3:
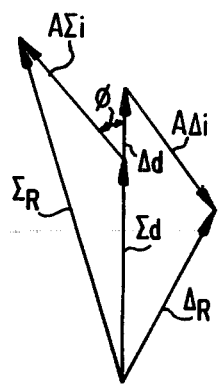
FIG. 3 is a vector diagram illustrating the resultant sum and difference signals obtained with the monopulse radar system of FIG. 1.

As a result of the sum, elevation difference and error patterns produced by typical monopulse feedhorn array, multipath signals received as in FIG. 1, may be combined by the antenna sum and difference signal channels to provide resultant sum and elevation difference signals $\Sigma_R$ and $\Delta_R$ respectively, as shown in FIG. 3.

Referring to FIGS. 2B and 3, the sum and difference signals may be represented as vectors $\Sigma$ and $\Delta$ proportional in length to the signals they represent. The sum and difference vectors for the actual target and its image have relationships determined by the antenna patterns, elevation of the target, and reflection coefficient A of the reflective surface 18. If $\Sigma i$, $\Sigma d$, $\Delta i$, and $\Delta d$ are the gains of the sum and difference patterns in the directions of the true target T and image target I, respectively, if the phase relationships of the signals at the antenna is $\phi$ and if the reflection coefficient of the reflective surface 18 is A, then the sum and difference vectors may be added as illustrated in FIG. 3 to calculate the resultant sum and difference vectors $\Sigma_R$ and $\Delta_R$.

The ratio of the resultant difference vector to the resultant sum vector produces a resultant error signal $E_R$. This resultant error signal $E_R$ is typically developed at the output of the phase detector in a conventional monopulse processing system and has an in-phase component $E_P$ (the ratio of the projection of the vector $\Delta_R$ on the vector $\Sigma_R$ to the vector $\Sigma_R$) and a quadrature component $E_q$ (the ratio of the projection of the vector $\Delta_R$ onto the quadrature axis of the vector $\Sigma_R$ to the vector $\Sigma_R$). From a trigonometric analysis of FIGS. 2B and 3, the in-phase component $E_p$ and the quadrature component $E_q$ the resultant error signal after automatic gain control may be expressed as follows:

$$E_p = \frac{\Sigma d \, \Delta d + A^2 \, \Sigma i \, \Delta i + A \cos \phi \, (\Sigma d \, \Delta i + \Sigma i \, \Delta d)}{\Sigma d^2 + A^2 \, \Sigma i^2 + 2A \cos \phi \, \Sigma d \, \Sigma i} \qquad (2)$$

$$E_q = \frac{A \sin \phi \, (\Sigma d \, \Delta i - \Sigma i \, \Delta d)}{\Sigma d^2 + A^2 \, \Sigma i^2 + 2A \cos \phi \, \Sigma d \, \Sigma i} \qquad (3)$$

With normal closed-loop tracking, the antenna 10 of FIGS. 1 and 2A is driven by the antenna drive servo until the elevation tracking error voltage $E_p$ is nulled. In the presence of multipath signals, the radar antenna may have boresight elevation equilibrium positions defined by the curves 20 of FIG. 4.

Figure 4:
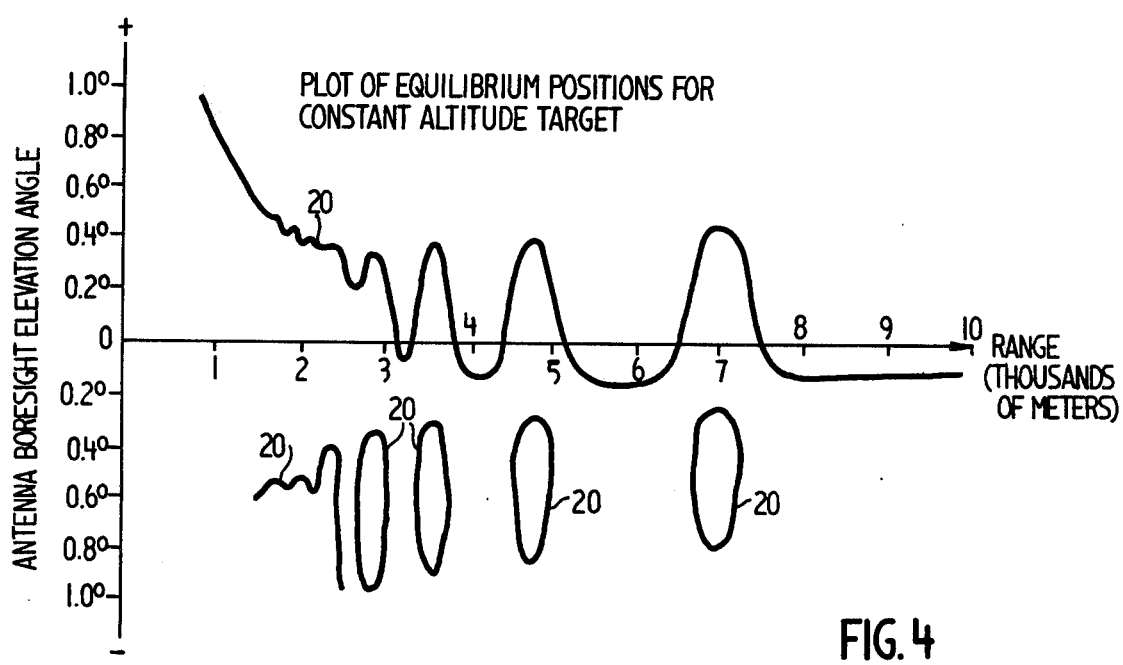
FIG. 4 is a graph illustrating the equilibrium positions of a monopulse radar system tracking a low elevation target in the presence of multipath signals.

With reference to FIG. 4, it can be seen that there is a continuous locus of equilibrium positions which the radar will probably follow if both target velocity and system inertia are not too great. This locus may result in peak errors of almost half a beamwidth. In addition, there exist isolated regions of equilibrium about the image where the error is much greater. If the radar reaches these isolated regions of equilibrium there is a high probability that it will lose track.

It can be seen from equations (2) and (3) that if there is no image signal, the quadrature component $E_q$ of the error signal is zero and the in-phase component $E_p$ of the error signal reduces to the ratio of the direct difference signal $\Delta d$ to the direct sum signal $\Sigma d$. It can further be seen from equation (3) above that if $$\Sigma i \, \Delta d = \Sigma d \, \Delta i \quad (4)$$

or $$\frac{\Delta d}{\Sigma d} = \frac{\Delta i}{\Sigma i} \quad (5)$$

then the quadrature component $E_q$ is also equal to zero, and, using this same equality, the expression for $E_p$ of equation (2) also reduces to $$E_p = \frac{\Delta d}{\Sigma d} \quad (6)$$

thereby making the in-phase component $E_p$ of the error signal independent of the strength of the reflected signal which produces the image target.

Figure 5:
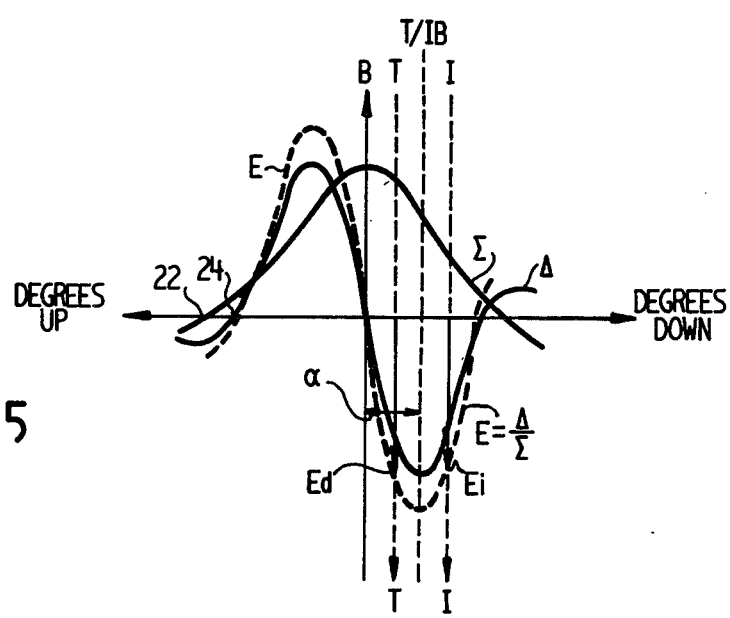
FIG. 5 is a graphical representation of the sum, difference and error functions of a monopulse radar system operable in accordance with the present invention.

In order to achieve the equality of equation (5), it must be possible to set the boresight elevation angle such that the value of the error signal E in the direction of the target and in the direction of the target image are equal. Referring now to FIG. 5, one way in which the equality of equation (5) can be provided is by shaping the error function, i.e., the curve $E = \Delta/\Sigma$ so that the error function has a peak amplitude value at a predetermined off-boresight angle and decreases in amplitude generally symmetrically on each side of the peak amplitude value. As is illustrated in FIG. 5, the peak amplitude of the desired error function E is generally symmetrical, about an angular off-boresight position represented by the angle $\alpha$. In order to obtain this shape of the error function, the first null of the sum pattern $\Sigma$ produced by the sum signal channel of the monopulse radar antenna must occur beyond the first null of the difference pattern $\Delta$ produced by the difference signal channel of the antenna. Thus, as is illustrated in FIG. 5, the first null 22 of the sum pattern $\Sigma$ occurs beyond, i.e., at a greater off-boresight angle than, the first null of the difference pattern $\Delta$.

With continued reference to FIG. 5, it can be seen that if the boresight B of the antenna is positioned with respect to the horizon such that the target/image bisector T/IB intersects the peak of the error function E, the image error signal $E_i$ is equal to the direct error signal $E_d$. Thus, when tracking a low elevation target with a monopulse radar antenna and signal processing circuit which provide the patterns illustrated in FIG. 5, the equality of equation 5 above may be achieved by setting the elevation of the antenna boresight B at an angle $\alpha$ with respect to the target/image bisector I/IB.

One embodiment of an antenna array for producing the sum and difference signal patterns $\Sigma$ and $\Delta$ of FIG. 5 is schematically illustrated in FIG. 6. Referring now to FIG. 6, a conventional four horn monopulse radar antenna generally indicated at 26 may be modified through the addition of two additional feedhorns 28 and 30, with one of the additional feedhorns 28 and 30 disposed above the conventional antenna 26 and the other of the additional feedhorns disposed below the conventional antenna 26. In addition, as will be described in connection with FIGS. 7A and 7B, the length of the feedhorns 26 may be increased sufficiently to suppress the double cosine taper thereof.

The additional feedhorns 28 and 30 may be electrically coupled to the sum and elevation difference signal channels of the antenna 26 through the use of suitable conventional microwave couplers generally indicated at 32 and 34, respectively. As a result of this feedhorn configuration, the sum beam or pattern is broadened and the elevation difference beam or pattern is shaped to provide the desired symmetry of the E function.

Figure 7A:
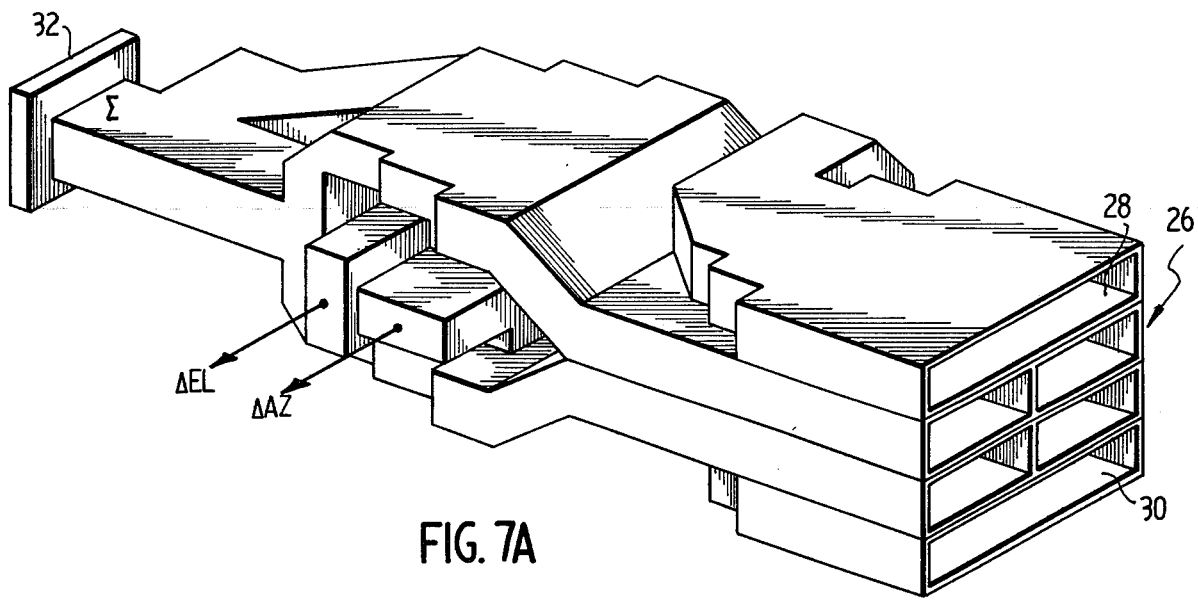
FIGS. 7A and 7B are pictorial views of one embodiment of the feedhorn of FIG. 6 as viewed from the right and left sides thereof, respectively.
Figure 7B:
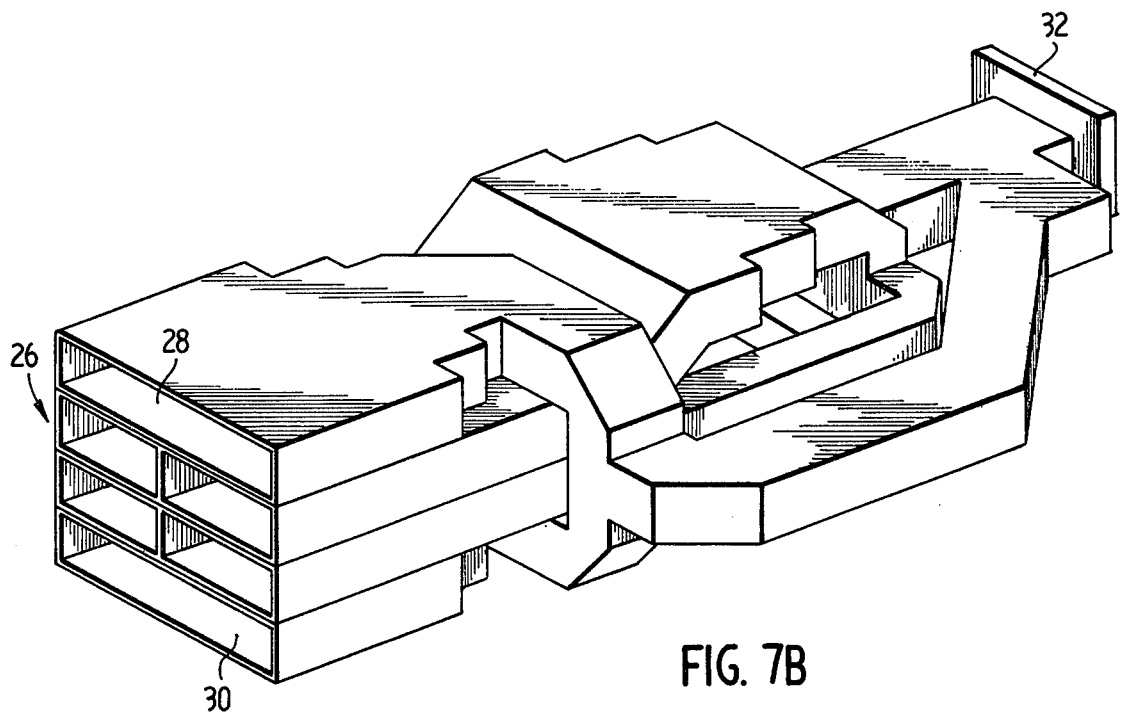

Referring now to FIGS. 7A and 7B wherein a pictorial view of an embodiment of the antenna of FIG. 6 is illustrated, the feedhorn for obtaining the desired sum and elevation difference patterns of FIG. 5 may be configured in any suitable manner in accordance with conventional wave-guide techniques. The centrally disposed four horn cluster 26 may feed back from the front of the antenna 26 to a waveguide connector 32 to provide the sum channel. The overall length of the feedhorns may be somewhat greater than conventional arrays of this type to suppress the double cosine taper ordinarily associated therewith. Each of the additional feedhorns 28 and 30 may be suitably coupled to the sum signal channel of the antenna array 26 through, for example, an 8dB coupler, in the vicinity of the waveguide connector 32 as illustrated. The difference signal channel $\Delta$EL of the four horn antenna array 26 may be coupled to the additional feedhorns 28 and 30 in a suitable manner such as through the use of a conventional 8dB coupling technique (not shown).

The size and shape of the waveguide employed in producing the antenna array of FIGS. 7A and 7B will, of course, vary with radar frequency. The design parameter for the antenna array are generally illustrated in FIG. 5 and may be met through the use of well known antenna design techniques which may result in the exemplary antenna configuration of FIGS. 7A and 7B.

As was previously discussed in connection with FIG. 5, a lower limit of antenna boresight elevation is determined as a function of the predetermined off-boresight angle at which the error function E peaks and off-boresight tracking is employed for targets below this predetermined elevation. Antenna boresight elevation may be controlled and target elevation tracking error signals may be generated through the use of signal processing circuits such as those illustrated functionally in FIG. 8 and in greater detail in FIG. 9.

Referring now to FIG. 8, the sum and elevation difference signals $\Sigma$ and $\Delta$ from the sum and elevation difference signal channels of the monopulse radar antenna array may be applied to a suitable conventional tracking error processor 34 for the calculation of a normalized elevation signal E in a conventional manner. The normalized elevation error signal E may be supplied to a boresight control unit 36 described hereinafter in greater detail, and an antenna boresight elevation signal both fine and coarse may be supplied in a suitable, conventional manner, e.g., from antenna elevation position resolvers 37, to the boresight control unit 36.

A signal R representative of the range to the target may be applied to a boresight elevation limit calculator 38 and the LIMIT output signal from the boresight elevation limit calculator 38 may be supplied to the boresight control unit 36. The boresight control unit 36 may produce a target elevation signal $EL_{tat}$ indicative of the elevation of the target being tracked with reference to some predetermined reference elevation, e.g., zero degrees or the horizontal. The boresight control unit 36 may also produce an elevation servo drive signal for application to the antenna elevation drive servo which positions the radar antenna.

In operation, the sum and elevation difference signals are processed by the tracking error processor 34 in a conventional manner and the normalized elevation tracking error signal E is applied to the boresight control unit 36. In the preferred embodiment of the invention, the boresight elevation limit calculator 38 calculates the lower limit of the boresight elevation angle as a function of the predetermined off-boresight angle at which the error function E peaks and as a function of target range. However, it should also be understood that improved results over prior art systems are obtained at low target elevation by employing the off-boresight tracking technique of the invention without the novel antenna array of FIGS. 6 and 7. In this situation, the lower boresight elevation limit may be fixed as merely a function of target range.

With continued reference to FIG. 8, if the curvature of the earth could be ignored, the target range value R could also be ignored and the LIMIT signal could be set at a fixed value in relation to the horizon dependent solely on the position of the peak of the E function. However, in the normal curved earth situation, the peak of the error function E must be directed not to the horizon but along the bisector of the target/image angle, i.e., along the line designated T/IB in FIG. 5, in the preferred embodiment. It can be shown that the direction of this target/image bisector is almost entirely a function of range and is hardly affected by changes in target elevation at the low elevations of interest. Since it is possible to measure range accurately despite the presence of multipath signals, it is relatively simple to maintain the peak of the error function E in the desired direction as a function of the position of the peak of the error function relative to the antenna boresight (a fixed quantity for a particular antenna) and as a function of range.

If the antenna boresight elevation angle is above the predetermined boresight elevation limit as determined by a comparison between the boresight elevation signal and the LIMIT signal by the boresight unit 36, the radar system tracks the target in a normal closed-loop mode of operation through the application of the elevation servo drive signal from the boresight control unit 36 to the antenna elevation drive servo. Upon coincidence between the antenna boresight elevation and the boresight elevation limit, the antenna elevation drive servo is, in effect disabled at the elevation limit and the radar employs off-boresight open-loop tracking below this lower limit.

At all times, target elevation is indicated by the target elevation signal $EL_{tgt}$ which, as will hereinafter be described, is a combination of the tracking error signal E and the boresight elevation signal from the unit 37.

Referring now to FIG. 9 wherein one embodiment of the boresight control unit 36 of FIG. 8 is illustrated in greater detail, the normalized error signal E from the tracking error processor 34 may be applied through a suitable amplifier 40 to a summing node 42, to a summing node 44, and to a summing node 46 through the respective summing resistors 48, 50 and 52. A suitable target range computer 54 in the radar system may provide the range signal R to the boresight elevation calculator 38 and the LIMIT output signal from the calculator 38 may be applied through a summing resistor 56 to the summing node 46. The fine and coarse output signals from the antenna boresight elevation device 37 may be applied to respective amplifiers 58 and 60. The output signal from the amplifier 58 may be applied through a summing resistor 62 to the summing node 42 and through a resistor 64 to the summing node 46. The output signal from the amplifier 60 may be applied through a summing resistor 66 to the summing node 46 and an on-off switch 68 may selectively supply a negative bias voltage (in the off position) to the summing node 46 through a summing resistor 70.

The summing node 42 may be connected to an input terminal of a suitable amplifier 72 and the output signal from the amplifier 72 may be supplied to radar processing and/or display circuits as the target elevation signal $EL_{tgt}$. The summing node 46 may be connected to an input terminal of a suitable amplifier 74, and the output signal from the amplifier 74 may be applied through a summing resistor 76 to the summing node 44. The summing node 44 may be connected to an input terminal of a suitable amplifier 78 and the elevation drive signal from the amplifier 78 may be supplied to the antenna elevation drive servo 80 of the radar system.

A diode 82 may be provided in series with the output signal line from the amplifier 60 so that the coarse antenna boresight elevation signal inhibits off-boresight operation unless the antenna boresight elevation is below some arbitrarily selected angular value, e.g., 4°. A diode 84 may be provided in series with the output signal line from the amplifier 74 so that the output signal from the amplifier 74 does not affect the input signal to the amplifier 78 until the calculated lower limit of boresight elevation is attained. In addition, a feedback resistor 86 is connected between the summing node 46 and the diode 84 - resistor 76 junction.

In operation, the boresight elevation limit calculator 38 calculates the lower limit of boresight elevation as a function of target range and the off-boresight position of the peak of the error function E as was previously described. Above this lower boresight elevation limit, the output signal from the amplifier 74 does not affect the input signal to the amplifier 78 and thus the antenna elevation drive servo 80 is driven solely in response to the amplified tracking error signal E from the amplifier 40. The target elevation signal $EL_{tgt}$, in this closed-loop tracking mode, will typically be equal to antenna boresight elevation.

When the antenna boresight elevation coincides with the calculated boresight elevation limit, the amplifier 74 takes over control of the antenna elevation drive servo 80 through the amplifier 78 and holds the antenna boresight elevation at the calculated boresight elevation limit. The FINE antenna boresight elevation signal provides an indication to the amplifier 72 as to this limit position of antenna boresight elevation and the tracking error processor 34 provides an off-boresight tracking error signal E which is summed with the FINE signal at the summing node 42. The $EL_{tgt}$ signal thus indicates actual target elevation through combining the antenna boresight elevation with the off-boresight tracking error signal. The radar system operates in this open-loop tracking mode until the elevation tracking error signal E becomes positive indicating that the target elevation is above the lower limit of boresight elevation. Thereafter, the radar system may revert to the closed-loop tracking mode.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a monopulse tracking radar system, apparatus for tracking low elevation targets comprising:
    antenna means for receiving wave energy reflected from a target, said antenna means having a predetermined boresight;
    means for generating an elevation tracking error signal related to an angular difference in elevation between a line-of-sight to the target and the antenna means boresight in response to the received wave energy;
    means for driving said antenna means in a direction tending to minimize said elevation tracking error signal; and,
    means for disabling said driving means in response to approximate coincidence between actual antenna means boresight elevation angle and a predetermined lower limit of antenna means boresight elevation angle, wherein said antenna means includes:
    a sum receiving channel for providing a sum signal in response to received wave energy;
    an elevation difference receiving channel for providing an elevation difference signal in response to received wave energy;
    means for modifying said sum signal and said elevation difference signal so that, with the antenna means boresight positioned in approximate coincidence with said predetermined lower limit, the ratio of said elevation difference signal to said sum signal for targets below said antenna means boresight is approximately the same for wave energy received along a direct path and for wave energy received along a reflected path.

2. The apparatus of claim 1 wherein said predetermined lower limit varies as a function of target range.

3. In a monopulse tracking radar system, apparatus for tracking low elevation targets comprising:
    antenna means for receiving wave energy reflected from a target, said antenna means having a predetermined boresight;
    means for generating an elevation tracking error signal related to an angular difference in elevation between a line-of-sight to the target and the antenna means boresight in response to the received wave energy;
    means for driving said antenna means in a direction tending to minimize said elevation tracking error signal;
    means for disabling said driving means in response to approximate coincidence between actual antenna means boresight elevation angle and a predetermined lower limit of antenna means boresight elevation angle;
    said antenna means includes:
    a sum receiving channel for providing a sum signal in response to received wave energy;
    an elevation difference receiving channel for providing an elevation difference signal in response to received wave energy;
    means for modifying said sum signal and said elevation difference signal so that, with the antenna means boresight positioned in approximate coincidence with said predetermined lower limit, the ratio of said elevation difference signal to said sum signal is approximately the same for wave energy received along a direct path and for wave energy received along a reflected path;
    said predetermined lower limit varies as a function of target range; and
    said antenna means includes a cluster of four feed horns approximately symmetrically disposed about said antenna means boresight, said modifying means including two additional feed horns disposed respectively above and below said cluster of four feedhorns and operatively coupled thereto.

4. In a monopulse tracking radar system, apparatus for tracking low elevation targets comprising:
    antenna means for receiving wave energy reflected from a target, said antenna means having a predetermined boresight;
    means for generating an elevation tracking error signal related to an angular difference in elevation between a line-of-sight to the target and the antenna means boresight in response to the received wave energy;
    means for driving said antenna means in a direction tending to minimize said elevation tracking error signal; and,
    means for disabling said driving means in response to approximate coincidence between actual antenna means boresight elevation angle and a predetermined lower limit of antenna means boresight elevation angle, wherein said disabling means includes:
    means for determining said lower limit of antenna means boresight in response to target range;
    means responsive to said lower limit and said actual antenna means elevation boresight angle for supplying said elevation tracking error signal to said driving means with said antenna means elevation boresight angle above said lower limit and for supplying said lower limit to said driving means with said actual elevation boresight angle in approximate coincidence with said lower limit.

5. In a monopulse tracking radar system, apparatus for tracking low elevation angle targets comprising:
    antenna means for receiving wave energy, said antenna means including means defining a selectively positionable antenna elevation boresight, a sum signal channel and an elevation difference signal channel, said sum and elevation difference signal channels producing respective sum and difference signal patterns referenced to said antenna boresight in response to received wave energy,
    said sum and elevation difference signal patterns each having a zero amplitude value for wave energy received at an elevation boresight angle below the antenna boresight, the zero amplitude value of the elevation difference signal pattern occurring at a smaller off-boresight angle than the zero amplitude value of the sum signal pattern;
    means operatively connected to said sum and elevation difference signal channels for generating an elevation tracking error signal, said elevation tracking error signal having an absolute peak amplitude value at a predetermined off-boresight angle and lower absolute amplitude values generally symmetrically disposed on each side of said peak amplitude value; and,
    means for limiting the elevation of the antenna boresight to positions above a predetermined angular elevation.

6. The apparatus of claim 5 including means responsive to said limiting means for driving said antenna means in a direction tending to null said elevation tracking error signal, said driving means being disabled by said limiting means at said predetermined angle elevation.

7. The apparatus of claim 5, including means for determining target range and for supplying an indication thereof to said limiting means, said predetermined angular elevation being a function of target range.

8. In a method for monopulse radar tracking, a method for tracking low elevation targets comprising:
transmitting wave energy toward a target;
receiving, with respect to a predetermined antenna boresight, wave energy reflected from the target;
generating an elevation tracking error signal related to an angular difference in elevation between a line-of-sight to the target and the antenna boresight in response to the received wave energy;
driving said antenna boresight in a direction tending to minimize said elevation tracking error signal; and,
discontinuing the driving of the antenna boresight approximate coincidence between actual antenna boresight elevation angle and a predetermined lower limit of antenna boresight elevation angle, including the steps of:
summing the received wave energy to provide a sum signal;
subtracting wave energy received through two legs of an elevation difference receiving channel to provide an elevation difference signal;
modifying the sum signal and the elevation difference signal so that, with the antenna boresight positioned in approximate coincidence with said predetermined lower limit, the ratio of said elevation difference signal to said sum signal is approximately the same for wave energy received along a direct path and for wave energy received along a reflected path.

9. The method of claim 8 including the steps of varying said predetermined lower limit as a function of target range.

10. In a method for monopulse radar tracking, a method for tracking low elevation targets comprising:
transmitting wave energy toward a target;
receiving, with respect to a predetermined antenna boresight, wave energy reflected from the target;
generating an elevation tracking error signal related to an angular difference in elevation between a line-of-sight to the target and the antenna boresight in response to the received wave energy;
driving said antenna boresight in a direction tending to minimize said elevation tracking error signal; and,
discontinuing the driving of the antenna boresight approximate coincidence between actual antenna boresight elevation angle and a predetermined lower limit of antenna boresight elevation angle, including the steps of:
determining said lower limit of antenna boresight in response to target range; and,
driving antenna boresight in elevation in response to said elevation tracking error signal with said antenna boresight elevation angle above said lower limit and fixing said antenna boresight elevation at said lower limit with said actual elevation boresight angle in approximate coincidence with said lower limit.

11. In a monopulse tracking radar system, apparatus for tracking low elevation targets in the presence of multi-path signals comprising:
means for transmitting wave energy toward a target;
means for receiving, with respect to a predetermined antenna boresight, wave energy reflected from an actual target and from its image target to form sum ($\Sigma$) and difference ($\Delta$) vector signals representative of said actual target and said image target;
means for shaping the elevation error function (E), the curve E equaling $\Delta/\Sigma$, to form a peak amplitude value at a predetermined off boresight angle with a decreasing amplitude symmetrically on each side of said peak amplitude value; and
means for setting the boresight elevation angle such that the value of the error signal E due to said wave energy received in the direction of the target and in the direction of the image target are equal.

12. In a method for monopulse radar tracking, a method for tracking low elevation targets in the presence of multi-path signals comprising:
transmitting wave energy toward a target;
receiving, with respect to a predetermined antenna boresight, wave energy reflected from an actual target and from its image target to form sum ($\Sigma$) and difference ($\Delta$) vector signals representative of said actual target and said image target;
shaping the elevation error function (E), the curve E equaling $\Delta/\Sigma$, to form a peak amplitude value at a predetermined off boresight angle with a decreasing amplitude symmetrically on each side of said peak amplitude value; and
setting the boresight elevation angle such that the value of the error signal E due to said wave energy received in the direction of the target and in the direction of the image target are equal.

* * * * *